UNITED STATES PATENT OFFICE.

HENRY M. PIERCE, OF NASHVILLE, TENNESSEE.

PROCESS OF UTILIZING WOOD-GASES FOR METALLURGICAL PURPOSES.

SPECIFICATION forming part of Letters Patent No. 326,452, dated September 15, 1885.

Application filed March 11, 1885. (No model.)

*To all whom it may concern:*

Be it known that I, HENRY M. PIERCE, of Nashville, in the county of Davidson and State of Tennessee, have invented certain new and useful Improvements in Processes of Utilizing Wood-Gases for Metallurgical Purposes; and I do hereby declare that the following is a full, clear, and exact description of the invention, which will enable others skilled in the art to which it appertains to make and use the same, reference being had to the specification.

My present invention relates to the utilization of a certain waste gas or gases—to wit., non-condensable gases evolved in the distillation and carbonization of wood—for metallurgical purposes, whereby a chemically-pure heat is produced, and whereby a metal of better quality is obtained.

For the purposes of this description I have seen fit to describe it in conjunction with other fuel in a blast-furnace or smelting process, in which process it is necessary to use other fuel, such as charcoal, coke, or other solid fuel, in order to prevent scaffolding, to preserve in a measure the permeability of the mass, and to supply a deoxidizer and carburizer, though it is evident that in the puddling-furnace and in the heating and melting of metals, where the physical conditions required are different, these gases may be used, either in combination with other gases or independently, as a fuel, and the same valuable results due to its chemical purity will be correspondingly obtained.

To put into practical operation my invention, I employ an ordinary charcoal pig-iron blast-furnace provided with suitable air and gas inlets, and combine therewith a heating-chamber. To this heating-chamber is connected a reservoir for receiving and equalizing the pressure of gases from a condenser, which gases are generated in an ordinary charcoal-kiln. Communicating with the equalizer, and passing through the heating-chamber, is a coil of pipe conveying the wood-gases from said equalizer to the gas inlet or injector of the blast-furnace, the injector serving to mix atmospheric air with the gas, if desired. From the upper portion of the blast-furnace is projected a pipe which conducts the spent gases and products of combustion into the heating-chamber, where it serves to heat the coil of pipe and its contained gases on their way to the blast-furnace.

Heretofore, in ordinary practice, the blast-furnace has been supplied at regular intervals with charcoal, ore, and a flux in proper proportions, sufficient charcoal being used to generate the heat required to reduce the ore to metal.

I employ a furnace similar in general construction to the ordinary blast-furnace. I charge the furnace in the usual manner with the same proportionate amounts of ore and flux as would be used were charcoal the sole fuel. The amount of charcoal, however, charged at the same time with the ore and flux is graduated to supplement the fuel furnished in the wood-gases. These gases are injected, either warm or cold, into the blast-furnace in or above the air-tuyere zone. In the furnace they mix with the hot or cold air-blast and are consumed. The combustion of these gases and of the charcoal distributed throughout the charge furnishes heat sufficient to carry on the ore reducing process. I find in practice that sixty per cent. of these gases to forty per cent. of the solid fuel heretofore used is efficient.

The value and importance of this gaseous fuel as applied to metallurgical purposes, and the extent to which it may lessen the use of charcoal in a blast-furnace, may perhaps be more fully appreciated by noting the following facts: A cord of wood, seasoned, weighs, say, four thousand pounds. In reducing this cord of wood to charcoal we obtain of charcoal, by weight, say, one thousand pounds, or one-quarter of the entire weight of the wood. The remaining three thousand pounds pass off in the form of gases. These gases are largely hydrocarbons, which, properly prepared and managed, are capable of generating a large amount of heat. Indeed, about one thousand of the three thousand pounds of the gases thrown off from each cord of wood reduced to charcoal is a fixed hydrocarbon gas, capable of producing, when mixed with air, chemically-pure flame, free from all injurious elements. A cord of wood will throw off in being reduced to charcoal about twenty-eight thousand cubic feet of gas. The ordinary charcoal-furnace requires about one hundred cords of wood daily for charcoal purposes. One hundred cords of wood, properly charred, will deliver, at any reasonable distance from the coaling-oven seven hundred thousand cubic feet, or fifty tons, of uncondensable gases; hence a hundred cords of wood will yield, in weight, as much fuel in form of gas as in form of charcoal. The conclusion is inevitable and correct, viz: by utilizing the fixed gases thrown off in making charcoal the amount of fuel produced by charcoal is doubled. In addition to this, gas fuel is free from ash and all injurious matter, and is easier converted to heat than charcoal or any other fuel.

These wood-gases are valuable, first, for their heat-producing power, and, secondly, because, being a gaseous fuel, they are more cheaply and easily introduced into a furnace and there converted into heat than a corresponding weight of the fixed fuels, and, finally, being chemically pure, produce a better quality of iron. Hence the employment of wood-gases as fuel in blast-furnaces in combination with more or less fixed fuels would, first, convert to profitable use valuable hydrocarbon gases now generally allowed to go to waste, and, secondly, would cheapen the production of metal by lessening the amount of charcoal now essential to its manufacture. Indeed, the utilization of these wood-gases is an economic necessity, in order to obtain the full value of the wood that is now daily becoming more scarce and higher priced.

I make no claim to the apparatus herein described, as such forms the subject-matter of a distinct application, filed November 3, 1884, Serial No. 147,112, and would refer thereto as an illustration of a complete means whereby this process may be carried into effect.

It will be understood, and without departing from the spirit of my invention, that the gases employed in the reducing-furnace may be either cold or heated.

What I claim, and desire to secure by Letters Patent, is—

1. The process herein described for the heating and smelting of ores and metals, which consists in subjecting the same to the heat produced by combining air with heated, non-condensable gases derived from the distillation or carbonization of wood, substantially as and for the purpose set forth and described.

2. The process herein described for the reduction of ores and metals, which consists in subjecting the ore, flux, and a percentage of solid fuel sufficient to supplement the gaseous fuel to the heat produced by combining air with heated non-condensable gases derived from the distillation or carbonization of wood, substantially as and for the purpose set forth and described.

3. In a blast-furnace, the process herein described of utilizing the gases evolved in the destructive distillation of wood as fuel, which consists in first conducting the wood-gases to a condenser and reducing to liquid their condensable constituents, then forcing the uncondensable gases into a heating-chamber which is heated by the waste-gases from the said blast-furnace, then mixing a suitable quantity of atmospheric air with said wood-gases, and then injecting the whole into a blast-furnace.

4. The process herein described of utilizing the gases evolved from the destructive distillation of wood, which consists in conducting the said gases into a condenser, then forcing the non-condensed gases under pressure into an equalizing-chamber, then through a heating-chamber, which latter is heated by the waste gases from the blast-furnace, and finally mixed with atmospheric air and forced into the blast-furnace, as described.

In testimony that I claim the foregoing as my own I affix my signature in presence of two witnesses.

HENRY M. PIERCE.

Witnesses:
E. EVERETT ELLIS,
O. E. DUFFY.